(12) United States Patent
Habermann et al.

(10) Patent No.: US 9,384,131 B2
(45) Date of Patent: Jul. 5, 2016

(54) SYSTEMS AND METHODS FOR ACCESSING CACHE MEMORY

(71) Applicant: International Business Machines Corporation, Armonk, NY (US)

(72) Inventors: Christian Habermann, Boeblingen (DE); Christian Jacobi, Schoenaich (DE); Sascha Junghans, Ammerbuch (DE); Martin Recktenwald, Schonaich (DE); Hans-Werner Tast, Schoenbuch (DE)

(73) Assignee: International Business Machines Corporation, Armonk, NY (US)

(*) Notice: Subject to any disclaimer, the term of this patent is extended or adjusted under 35 U.S.C. 154(b) by 496 days.

(21) Appl. No.: 13/843,278

(22) Filed: Mar. 15, 2013

(65) Prior Publication Data

US 2014/0281238 A1   Sep. 18, 2014

(51) Int. Cl.
*G06F 12/08* (2016.01)
(52) U.S. Cl.
CPC ........ *G06F 12/0811* (2013.01); *G06F 12/0862* (2013.01); *G06F 12/0897* (2013.01); *G06F 2212/1024* (2013.01)
(58) Field of Classification Search
CPC ............ G06F 12/0862; G06F 12/0897; G06F 2212/507; G06F 9/30047
See application file for complete search history.

(56) References Cited

U.S. PATENT DOCUMENTS

| 6,418,516 B1* | 7/2002 | Arimilli .............. | G06F 9/30047 |
| | | | 711/137 |
| 6,496,917 B1* | 12/2002 | Cherabuddi ........ | G06F 12/0831 |
| | | | 711/120 |
| 7,500,062 B2 | 3/2009 | Beukema et al. | |
| 2002/0169929 A1* | 11/2002 | Riedlinger .......... | G06F 12/0855 |
| | | | 711/140 |
| 2012/0102269 A1 | 4/2012 | Ono et al. | |

* cited by examiner

*Primary Examiner* — Ryan Bertram
(74) *Attorney, Agent, or Firm* — Eustace P. Isidore; Yudell Isidore PLLC

(57) ABSTRACT

Systems and methods for providing data from a cache memory to requestors includes a number of cache memory levels arranged in a hierarchy. The method includes receiving a request for fetching data from the cache memory and determining one or more addresses in a cache memory level which is one level higher than a current cache memory level using one or more prediction algorithms. Further, the method includes pre-fetching the one or more addresses from the high cache memory level and determining if the data is available in the addresses. If data is available in the one or more addresses then data is fetched from the high cache level, else addresses of a next level which is higher than the high cache memory level are determined and pre-fetched. Furthermore, the method includes providing the fetched data to the requestor.

19 Claims, 4 Drawing Sheets

SYSTEMS AND METHODS FOR ACCESSING CACHE MEMORY

FIELD OF THE INVENTION

The present disclosure relates to computer systems and more specifically to systems and methods for reducing delays while accessing data from memory.

BACKGROUND

There has been rapid advancement in design aspect of microprocessor in past few decades. Microprocessor designers keep on designing new microprocessors for enhancing performance, reducing access time, and in turn increasing efficiency of computer systems. One approach to improve access time to data may include several hierarchies of cache memory levels in the computer system. Usually, accessing data from cache memory is faster than accessing data from main memory of the computer system. Typically, cache memories are small blocks of high speed static RAM (SRAM), either on-chip with the microprocessor or off-chip (or both). Usually, the cache memory stores the content of memory locations that are likely to be accessed in the near future or more frequently. The cache memory can also include memory locations or one or more addresses that are near-neighbors to a recently accessed memory location. The memory subsystem can include multiple level of cache memory for achieving high instruction throughput rate.

Usually, microprocessors can access memory in sequential fashion. A lowest level of cache memory is usually smallest and fastest. It means accessing information from the lowest block is fastest. One implementation of these cache hierarchies is based on data duplication. Each level of the cache memory hierarchy can include the data stored in the next lower level of the cache memory. Lower level caches are smaller but can be accessed faster. Certain rules can be followed in order to keep the data coherent in all cache memory hierarchies. A fundamental rule used in many cache implementations is, not to fetch data from higher level caches that are still available in the lower level(s) of cache memory. Especially, this is true if the lower level cache hierarchies contain updates that have not yet propagated to the higher levels of cache memory. During execution of a program on the computer system, a processor may execute multiple processor instructions for referencing memory locations. While execution, the processor searches for required data at a memory location on a level 1 (L1) of cache memory. In case the data or referenced memory location is not available in the level 1 then a cache miss occurs. Then, the L1 cache can send a corresponding request to level 2 (L2) based on the L1 cache miss. Further, if the referenced memory location is also unavailable in L2 cache memory level, then additional memory request may be sent to higher memory levels. Therefore, these rules add to the latency that is observed when fetches from higher cache hierarchies have to be made.

Therefore, there exists a need for techniques to reduce latency while accessing data from cache memory.

BRIEF SUMMARY

Embodiments of the present disclosure provide a method for providing at least one data to one or more requestors from a cache memory including a number of cache memory levels arranged in a hierarchy. The method includes receiving, from a requestor, a request for fetching data from the cache memory. The method further includes determining one or more addresses in a cache memory level which is one level higher than a current cache memory level using one or more prediction algorithms. The one or more addresses are determined based on a future requirement of data. Further, the method includes pre-fetching the one or more addresses from the high cache memory level. The method also includes determining if the data is available in the one or more addresses. If data is available in the one or more addresses then data is fetched from the high cache level, else one or more addresses of a next level which is higher than the high cache memory level are determined and pre-fetched from one or more addresses. Furthermore, the method includes providing the fetched data to the requestor.

Another embodiment of the present disclosure provides a system for providing at least one data to one or more requestors from a cache memory including a number of cache memory levels arranged in a hierarchy. The system includes a receiver configured to receive, from a requestor, a request for fetching data from a requestor. The system also includes a pre-fetcher configured to determine one or more addresses in a cache memory level which is one level higher than a current cache memory level using one or more prediction algorithms. The one or more addresses are determined based on a future requirement of data. The pre-fetcher is also configured to pre-fetch the one or more addresses from the high cache memory level and determine whether the data is available in the one or more addresses. If the data is available in the one or more addresses then data is fetched from the high cache memory level. Else one or more addresses of a next level which is higher than the high cache memory level are determined and pre-fetched from one or more addresses. The system further includes a data provider configured to provide the fetched data to the requestor.

Yet another embodiment of the present disclosure provides a computer program product embodied on a computer readable medium having instructions for providing at least one data to one or more requestors from a cache memory including a plurality of cache memory levels arranged in a hierarchy. The computer program product performs the steps of receiving, from a requestor, a request for fetching data from the cache memory; determining one or more addresses in a cache memory level which is one level higher than a current cache memory level using one or more prediction algorithms, wherein the one or more addresses are determined based on a future requirement of data; pre-fetching the one or more addresses from the high cache memory level; determining if the data is available in the one or more addresses, wherein if data is available in the one or more addresses then data is fetched from the high cache level, else one or more addresses of a next level which is higher than the high cache memory level are determined and pre-fetched from one or more addresses; and providing the fetched data to the requestor.

BRIEF DESCRIPTION OF THE SEVERAL VIEWS OF THE DRAWINGS

Figure 1:
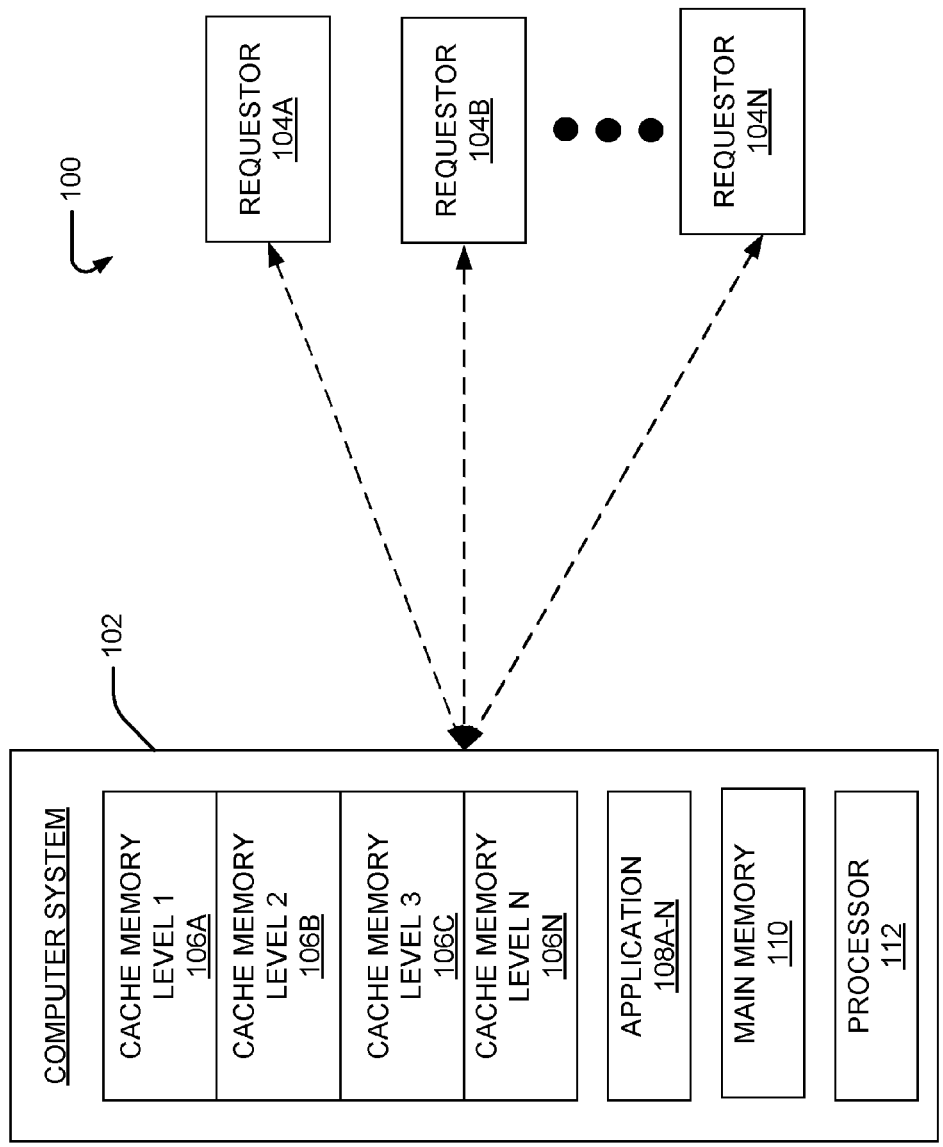
Figure 2:
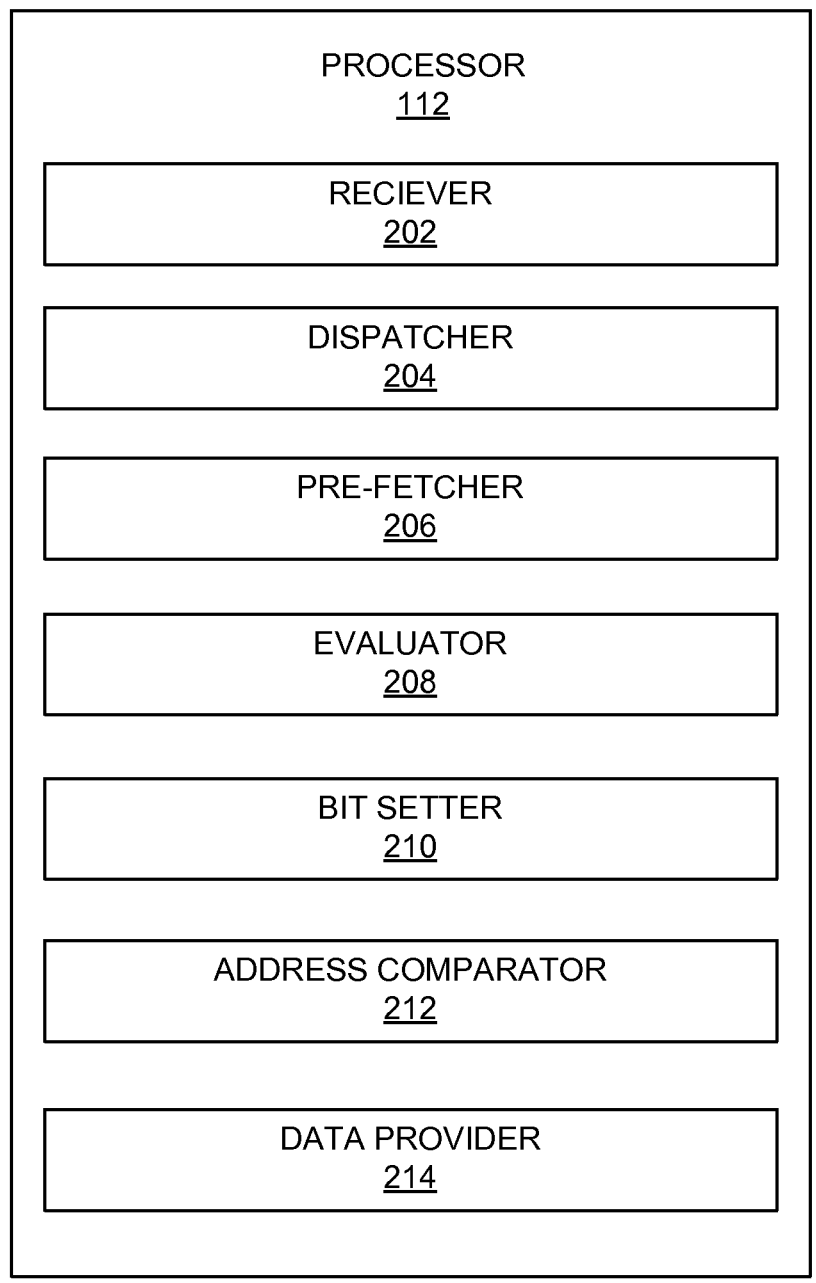
Figure 3:
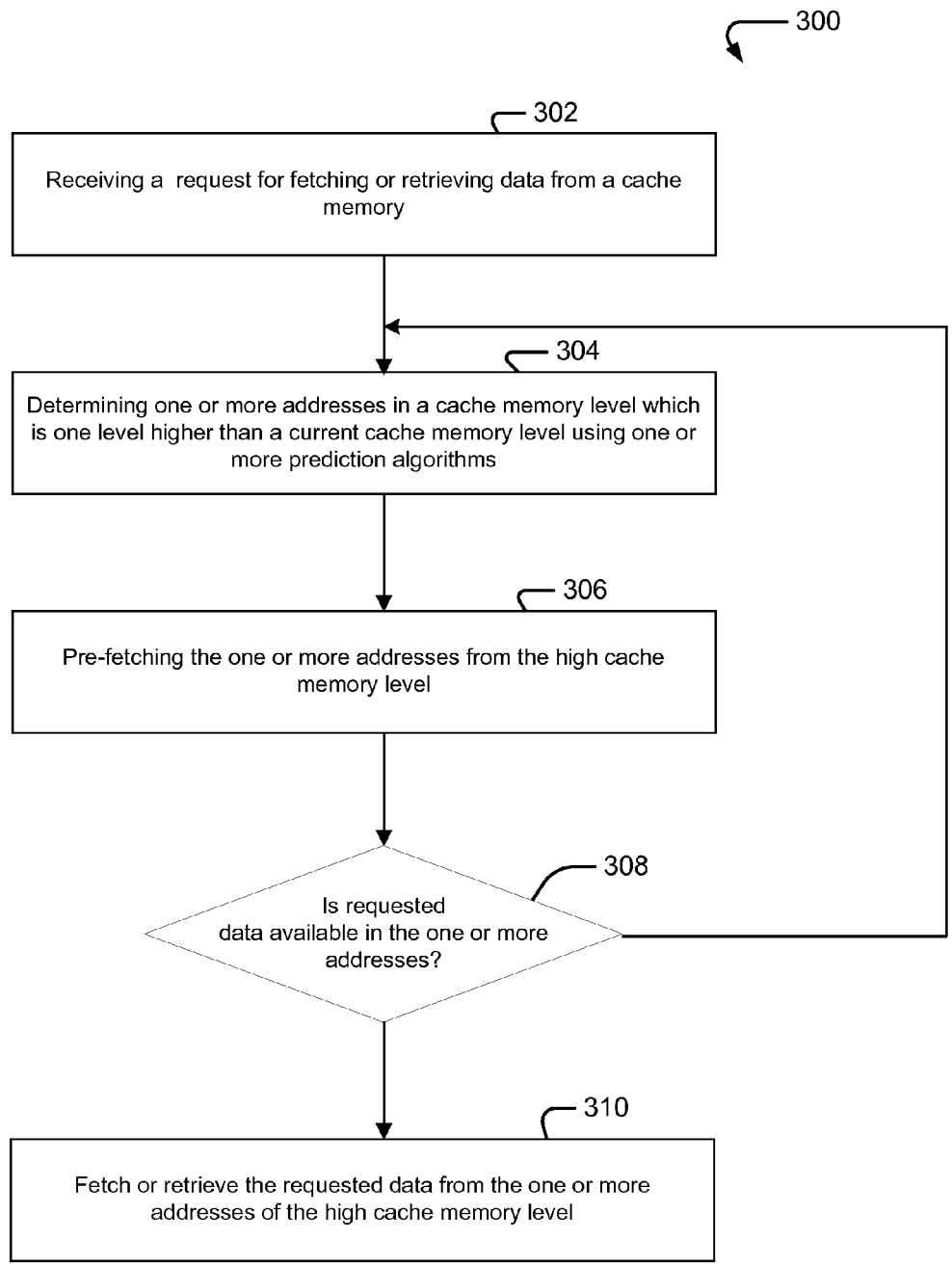
Figure 4:
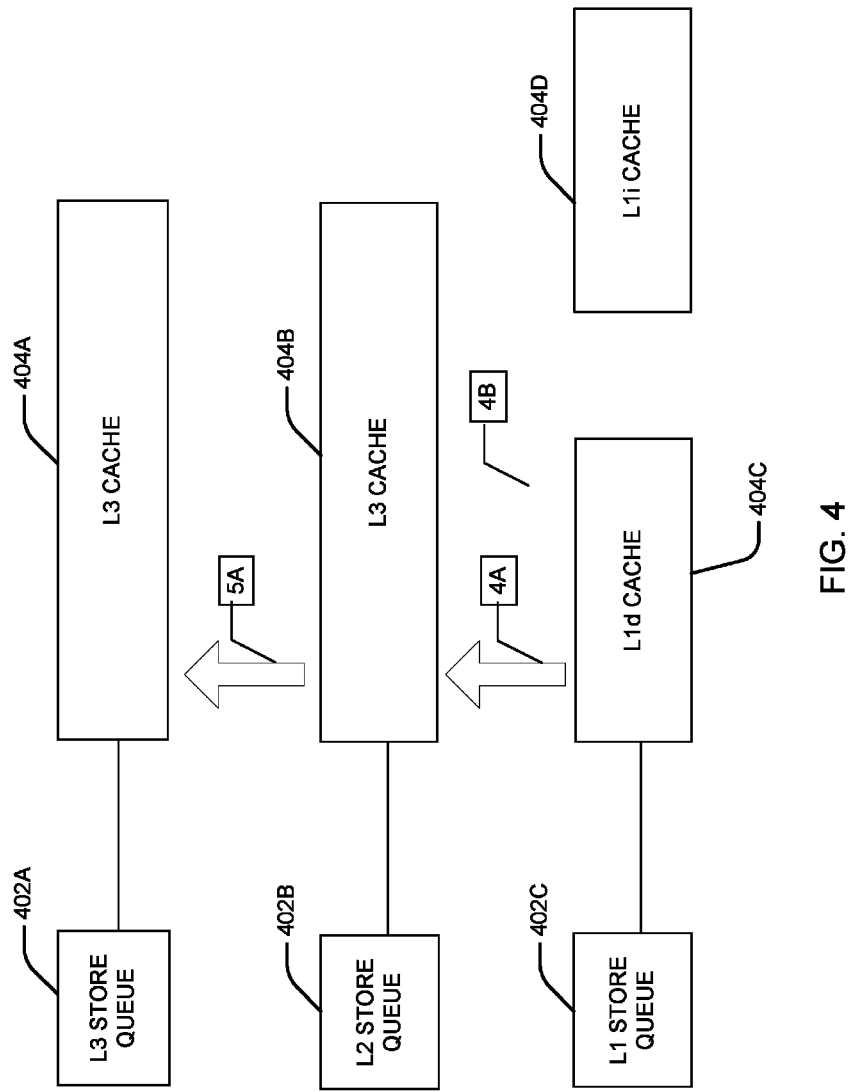

Having thus described the invention in general terms, reference will now be made to the accompanying drawings, which are not necessarily drawn to scale, and wherein:

FIG. 1 illustrates an exemplary environment where various embodiments of the present disclosure may function;

FIG. 2 illustrates exemplary components of a processor, in accordance with an embodiment of the present disclosure;

FIG. 3 is a flowchart illustrating a method for fetching data from memory, in accordance with an embodiment of the present disclosure;

FIG. 4 illustrates an example for fetching data from the memory, in accordance with an embodiment of the present disclosure.

DETAILED DESCRIPTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wired, optical fiber cable, RF cable, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the consumer's computer, partly on the consumer's computer, as a stand-alone software package, partly on the consumer's computer and partly on a remote computer or entirely on the remote computer or server. In the latter scenario, the remote computer may be connected to the consumer's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions, which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures and in particular with reference to FIG. 1, exemplary diagram of an environment where various embodiments of the present disclosure may function. It should be appreciated that FIG. 1 is only exemplary and are not intended to assert or imply any limitation with regard to the environment in which different embodiments may be implemented. Many modifications to the depicted environment may be made.

The present disclosure provides a system and a method for providing at least one data to one or more requestors from a cache memory including a plurality of cache memory levels arranged in a hierarchy. The computer system may process one or more requests for fetching data from memory. Though memory can be cache memory or a main memory. The cache memory includes multiple cache memory levels that include a number of addresses and content or data. The present disclosure provides methods and systems for efficiently fetching data from the cache memory.

FIG. 1 illustrates an exemplary environment 100 where various embodiments of the present disclosure may function. As shown, the environment 100 can include a computer system 102 and multiple requestors 104A-N. The computer system 102 can be any computing device capable of executing one or more applications 108A-N or program instructions. Examples of the computer system 102 may include, but are not limited to, a computer, a tablet computer, a cell-phone, a smart phone, a music player, an electronic device, and so forth. The requestors 104A-N can be users or one or more applications running on the computer system 102, or any other linked device. Wherein the linked device (not shown) may be connected to the computer system 102 through wired or wireless means. The wireless means may include a wireless network such as, but not limited to, a Wi-Fi network, Bluetooth, and so forth.

As shown, the computer system 102 can include a cache memory 106 including multiple cache memory levels 106A-N, the one or more applications 108, a main memory 110, and a processor 112. The multiple cache memory levels 106A-N may be arranged in a hierarchy. Each of the cache memory level 106A-N can store copies of data in multiple memory locations from frequently accessed memory locations of the main memory 110. Further, accessing data from the cache memory 106 is faster than accessing data from the main memory 110. For describing purpose only, it has been assumed that the cache memory level 106N is the lowest level and cache memory level 106A is the highest cache memory level in the cache memory hierarchy. The computer system 102 can be configured to receive one or more requests from the one or more requestors 104A-N for fetching data from the cache memory 106. Based on these requests, the processor 112 of the computer system 102 may execute one or more instruction(s). Further, the referenced location of the cache memory levels 106A-N including data can be accessed in a sequential manner. The access time for accessing data from a lower level e.g. a cache memory level 106N can be less then access time for accessing data from a higher level e.g. cache memory level 106N-1. This means, while referencing a memory location during execution of the instruction, a lowest cache level (i.e. 106N) is searched and when the referenced memory location is not found then a level which is one level up (i.e. cache memory level 106N-1) may be searched. This searching continues until either the referenced location is found or highest level of cache memory 106 is reached or searched.

Typically, accessing data or information from the main memory 110 usually takes more time then accessing data from the cache memory 106. The structural components or modules of the processor 112 are explained in detail in FIG. 2.

FIG. 2 illustrates exemplary components/modules of the processor 112, in accordance with an embodiment of the present disclosure. The processor 112 can include a receiver 202, a dispatcher 204, a pre-fetcher 206, an evaluator 208, a bit setter 210, an address comparator 212, a data provider 214, and a resolver 216. As discussed with reference to FIG. 1, the processor 112 can execute one or more instructions. For execution of these instructions, the processor 112 may require to access data stored in different memory locations of the cache memory 106. In some embodiments, the data may be accessed from the main memory 110. The receiver 202 can be configured to receive a request (or one or more requests) for fetching data from a requestor 104 (or requestors 104A-N). Hereinafter, the requestor 104 refers to a single requestor. The requestor 104 can be an application running on the computer system 102 or a user. Usually, the cache memory 106 stores data of frequently accessed addresses of the main memory 110.

Further, each of the cache memory levels 106A-N includes multiple addresses for storing content or data. In an embodiment, each of the cache memory levels 106A-N have an associated dispatcher of the dispatchers 204A-N. Further, the dispatcher associated with a cache memory level can be configured to dispatch a fetch to the next higher cache memory level as soon the request is received from the requestor 104. For example, a dispatcher 204N can dispatch a fetch to a cache memory level 106N-1 when a request for data is received. Each of the cache memory levels 106A-N can include a lookup queue or a store queue for storing a number of addresses, and a cache for storing data or content.

The pre-fetcher 206 can be configured to determine one or more addresses in a cache memory level which is one level higher (i.e. cache memory level 106N-1) than a current cache memory level (i.e. the lowest level 106N) using one or more prediction algorithms. The prediction algorithm can be any suitable algorithm including the conventional algorithm, related art and later developed algorithms. The one or more addresses are determined based on a future requirement of data by different instructions. The pre-fetcher 206 can also be configured to determine whether the data is available in the one or more addresses of the cache memory level. And, when requested data is available in the one or more addresses of the next high level i.e. cache level 106N-1, then the pre-fetcher 206 can fetch data from the high cache level (here cache level 106N-1). When data is not available in the lowest level (i.e. level 106N), then one or more addresses of a next higher level, i.e. 106N-2, which is higher than the high cache memory level i.e. 106N-1 are determined and pre-fetched. In an embodiment, the pre-fetcher 206 can determine and pre-fetch the one or more addresses in the cache memory level 106N-2.

The processor 112 also includes the evaluator 208. In an embodiment, the processor 112 may include multiple evaluators (not shown) associated with each of the cache levels 106A-N. Further, the evaluator 208 can be configured to evaluate one or more checks for determining a full miss or a full hit at each cache memory level 106A-N. The checks may include searching for data or address availability in the cache memory level 106A-N. When a referenced location is found in a cache memory level such as 106N, then it is called a full hit at the cache memory level 106N, and when the data is not available in the cache memory level (e.g. 106N) it is considered a full miss. In case of a full miss, a dispatch may be fetched to an upper level of cache memory 106 by the dispatcher 204.

The resolver 216 can be configured to resolve one or more issues based on the one or more checks performed. Further, the dispatcher 204 can also be configured to dispatch a secondary fetch for the same one or more address after resolving one or more issues. Further, the data provider 214 can discard the data fetched from the higher cache memory level when the result of the checks performed is negative. The result of checks performed at a current cache memory level (e.g. 106N) is positive when the data is not available in the current cache memory level and the result is negative when the data is available. When the result is negative, it means data can be fetched from the current memory level (106N) itself, and no further searching or fetching is required. When the result is positive, the data fetched from higher level is used. In an embodiment, data provider 214 can accumulate the data returned by one or more cache memory levels 106A-N including the high cache memory levels.

Further, the bit setter 210 is configured to set and reset at least two bits of a fetch address register (FAR) based on the one or more checks and resolution of one or more issues. The FAR stores address of each fetch that is dispatched from one cache memory level to another cache memory level. The bit setter 210 is further configured to set the at least two bits to "00" whenever a new fetch is dispatched. Further, the bit setter 210 is further configured to set the at least two bits to "10" after performing the one or more checks by each cache memory level 106A-N and resolving issues at each cache memory level 106A-N. The address comparator 212 can be configured to compare the multiple addresses of the look-up table of each of the cache memory levels 106A-N with addresses stored in the FAR while searching for one or more addresses referenced by an executing program.

The data provider 214 associated with a cache memory level in which addresses are present can provide the fetched data to the requestor 104. For example, if addresses are present in level 106N−1 then a data provider 214N−1 can provide data to the requestor 104.

FIG. 3 is a flowchart illustrating a method for fetching data from memory, in accordance with an embodiment of the present disclosure. As discussed with reference to FIG. 1 and FIG. 2, one or more requestors 104A-N may request for data stored in memory 106 (or man memory 110). The cache memory 106 is divided into multiple cache memory levels 106A-N. Each of the cache memory levels 106A-N can include a look up table for storing multiple addresses and a cache for storing data or content.

At step 302, a request for fetching data from the cache memory 106 is received from one or more requestors 104A-N. In an embodiment, the receiver 202 can receive the request(s). At step 304, one or more addresses in a cache memory level, which is one level higher than a current cache memory level are determined. In an embodiment, the pre-fetcher 206 may determine the one or more addresses by using one or more prediction algorithms. Then at step 306, the one or more addresses can be pre-fetched by the pre-fetcher 206. At step 308, it is checked whether the requested data is available in the one or more addresses in the high cache memory level. For example, the evaluator 208 can check for one or more addresses in the cache memory level 106N−1. If the requested data is unavailable, then process control goes to step 304 and further steps are repeated for higher levels of cache memory levels. In case the requested data is available at step 308 then step 310 is executed. At step 310, the requested data is fetched or retrieved from the high cache memory level. In some embodiments, the data provider 214 can retrieve the data from the one or more addresses of the high cache level or other cache memory levels (106A-N).

FIG. 4 illustrates an example for fetching data from the memory, in accordance with an embodiment of the present disclosure. As discussed with reference to FIGS. 1, 2, one or more requestors 104A-N may request for data stored in the cache memory 106. The cache memory 106 is divided into multiple cache memory levels 106A-N. In FIG. 4, for exemplary purpose three cache memory levels i.e. Level 1 (L1) cache memory 404C, Level 2 (L2) cache memory 404B, and Level 3 (L3) cache memory 404A are shown. But a person skilled in the art will appreciate that there can be any number of cache memory levels. Further, the disclosed system and method can be implemented with any number of cache memory levels. Each of the cache memory levels 404A-C can include a store queue (a look up table) for storing multiple addresses and a cache for storing data or content. For example, L3 cache memory 404A has an associated store queue 402A, the L2 cache memory 404B has an associated store queue 402B, and L1 cache memory 404C has an associated store queue 402C.

In an exemplary scenario, a fetch request (4A) for an address location A is received at the L2 cache memory 404B from the L1d cache memory 404C. As soon as the fetch request (4A) is received by the L2 cache memory 404B, the request can be dispatched to the L3 cache memory 404A. While waiting for a response from the L3 cache memory 404A, the L2 cache memory 404B performs all necessary look-ups or checks. The look ups may include, but not limited to, performing a directory look-up check, performing an address compare against a store queue 402B of the L2 cache memory 404B, and so forth. In an embodiment, the evaluator 208 associated with the L2 cache memory 404B performs the directory look-up. In addition, the address comparator 212 of the L2 cache memory 404B performs an address compare against a store queue 402B of the L2 cache memory 404B. All further actions depend on the outcome of these look-up and checks. The following outcomes 'R1', 'R2', and 'R3' are possible. The 'R1' refers to a case when there is a full miss. In case of a full miss, everything is ok and latency is reduced as data retrieved from the higher cache i.e. L3 cache memory 404A can be used. Basically, the L2 cache memory 404B internal look-ups do not add to the latency any more and are done within the natural L3 cache memory 404A internal delay. The 'R2' result refers to the case of an address hit in the L2 store queue 402B (i.e. current level of cache memory 106), the data is retrieved from the L2 cache memory 404B. The fetch (5A) which was dispatched to L3 cache memory 404A early and any data returned by the L3 cache memory 404A is dropped and not used. The 'R3' refers to a case when the directory look-up in the L2 cache memory 404B shows that address A is present in one of the L1 caches i.e. 404C or 404D. When result is 'R3' it might be necessary to send an invalidation command to resolve invalid combinations. Usually these invalid combinations can be resolved before data is returned by the L3 cache memory 404A, and thus the data can be retrieved from appropriate cache memory level 404A-C with reduced latency. If the invalid combination cannot be resolved fast enough it is sufficient to delay the data delivered by the L3 cache memory 404A internally and delay the response to the requestor (4B) until the invalid combination has been resolved.

A fetch address register (FAR) in the cache memory 106 stores address of each fetch that is dispatched from L2 cache memory 404B to L3 cache memory 404A. In addition to this FAR there are a certain number of line fetch buffers (LFBs) to accumulate the data returned by the L3 cache memory. To implement the disclosed system, two additional state bits have to be implemented for each FAR. With every new fetch that is dispatched to the L3 cache memory 404A the bits can be set to "00". If a fetch is returned by the L3 cache memory 404A while the state bits are still "00" the data is collected in one of the LFBs and is not processed any further. Once the L2 cache memory 404B has performed it's checks and all invalid combinations have been resolved these two bits can be set to "10". In the optimal case the state bits of FAR are already in the "10" state and data returned from the L3 cache memory 404A can be processed immediately. Whenever a store in the L2 store queue 402B is detected during the look-up the FAR is marked with "11". In this case the data returned by the L3 cache memory 404A cannot be trusted and must be dropped. Once the fetch has been completely returned by the L3 cache memory 404A, the L2 cache memory 404B can dispatch another fetch to the L3 cache memory 404A. The data returned for the first fetch is dropped.

The disclosed system 200 includes the address comparator 212 for performing an address compare. Since there is a certain amount of time between the dispatch of the fetch (4A) from L2 cache memory 404B to L3 cache memory 404A and the look-up against the L2 store queue 402B, the look-up misses all store queues that have left the L2 cache memory store queue 402B in between. To cover this all store queues that leave the L2 store queue 402B in direction to the L3 store queue 402C are compared against all outstanding FARs. In case of an address match the FAR is marked with "01". The FAR can wait until all look-ups are done and is then moved to "11". Now it is ready to re-spin the fetch from L2 cache memory 404B to L3 cache memory 404A once all data has been returned for the first invalid fetch.

Usually, certain rules can be followed in order to keep the data coherent in all cache memory hierarchies while accessing memory. A fundamental rule used in many cache implementations is, not to fetch data from higher level caches that are still available in the lower level(s) of cache memory. Especially, this is true if the lower level cache hierarchies contain updates that have not yet propagated to the higher levels of cache memory. The present disclosure provides methods and systems that allow to fetch data from a higher-level of cache memory hierarchy by ignoring all the rules used in conventional systems or related art. Instead of determining upfront if a fetch from the higher cache hierarchy is allowed, the disclosed system or method dispatches the fetch upfront and determines later if the data returned by the higher-level cache is allowed to be used or not.

It should be appreciated that the present invention does not affect pre-fetching algorithms implemented within a processor core. In an embodiment, the fetch requests dispatched by the processor core can be the result of clever pre-fetching algorithms or can simply be the result of following the instruction stream and collecting addresses that are referenced by the instruction stream. In an embodiment, the present invention affects the steps performed after a fetch request has been received by the cache hierarchy.

The disclosed systems or methods perform pre-fetching of one or more addresses to reduce the latency penalty of large higher-level caches. Pre-fetching is a method that uses prediction algorithms to determine addresses that may be needed in the near future. These addresses are then pre-fetched and if they are really needed later on, they already reside in a lower-level cache hierarchy.

The disclosed methods cut off the checks that used to be done before accessing the next higher cache level. Thus it helps to reduce the latency for normal fetches and for pre-fetches. Basically in disclosed methods, a fetch can be dispatched to the next higher level as soon as it is received from the requestor. The method then may evaluate the same checks as described above (address compare and store queue look-ups).

Embodiments of the invention are described above with reference to block diagrams and schematic illustrations of methods and systems according to embodiments of the invention. It will be understood that each block of the diagrams and combinations of blocks in the diagrams can be implemented by computer program instructions. These computer program instructions may be loaded onto one or more general-purpose computers, special purpose computers, or other programmable data processing translator to produce machines, such that the instructions, which execute on the computers or other programmable data processing translator create means for implementing the functions specified in the block or blocks. Such computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims. The invention has been described in the general context of computing devices, phone and computer-executable instructions, such as program modules, being executed by a computer. Generally, program modules include routines, programs, characters, components, data structures, etc., that perform particular tasks or implement particular abstract data types. A person skilled in the art will appreciate that the invention may be practiced with other computer system configurations, including hand-held devices, multiprocessor systems, microprocessor-based or programmable consumer electronics, network PCs, minicomputers, mainframe computers, and the like. Further, the invention may also be practiced in distributed computing worlds where tasks are performed by remote processing devices that are linked through a communications network. In a distributed computing world, program modules may be located in both local and remote memory storage devices.

This written description uses examples to disclose the invention, including the best mode, and also to enable any person skilled in the art to practice the invention, including making and using any devices or systems and performing any incorporated methods. The patentable scope the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the various embodiments of the present invention has been presented for purposes of illustration, but is not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for providing at least one data to one or more requestors from a cache memory including a plurality of cache memory levels arranged in a hierarchy, the method comprising:

receiving, from a requestor, a request for fetching data from the cache memory; determining one or more addresses in a cache memory level which is one level higher than a current cache memory level using one or more prediction algorithms, wherein the one or more addresses are determined based on a future requirement of data;

pre-fetching the one or more addresses from the high cache memory level;

determining if the data is available in the one or more addresses, wherein if data is available in the one or more addresses, then data is fetched from the high cache level, else one or more addresses of a next level which is higher than the high cache memory level are determined and data is pre-fetched from one or more addresses;

providing the fetched data to the requestor;

evaluating one or more checks for a full miss or a full hit at each cache memory level;

discarding the data fetched from the higher cache memory level when the result of the checks performed is negative;

resolving one or more issues based on the one or more checks performed;

dispatching a secondary fetch for the same one or more addresses after resolving one or more issues; and setting and resetting at least two bits of a fetch address register (FAR) based on the one or more checks and resolution of one or more issues, wherein the FAR stores multiple addresses.

2. The method of claim 1, further comprising dispatching a fetch to a next higher cache memory level as soon the request is received from the requestor, wherein each of the memory levels includes a lookup queue for storing a plurality of addresses, and a cache for storing a plurality of data.

3. The method of claim 1, wherein:
the at least two bits are set to "00" whenever a new fetch is dispatched; and
the at least two bits are set to "10" after performing the one or more checks by each cache memory level and resolving issues at each cache memory level.

4. The method of claim 1 further comprising accumulating the data returned by one or more cache memory levels including the high cache memory levels.

5. The method of claim 1 further comprising comparing the plurality of addresses of a look up table of each cache memory level with addresses stored in the FAR.

6. The method of claim 1, wherein the requestor is at least one of a user or a software application.

7. A system for providing at least one data to one or more requestors from a cache memory including a plurality of cache memory levels arranged in a hierarchy, the system comprising:
a receiver configured to receive, from a requestor, a request for fetching data from a requestor;
a pre-fetcher configured to:
    determine one or more addresses in a cache memory level which is one level higher than a current cache memory level using one or more prediction algorithms, wherein the one or more addresses are determined based on a future requirement of data;
    pre-fetch the one or more addresses from the high cache memory level; and
    determine whether the data is available in the one or more addresses,
    wherein if the data is available in the one or more addresses then the data is fetched from the high cache level, else one or more addresses of a next level which is higher than the high cache memory level are determined and pre-fetched data from one or more addresses;

a data provider configured to provide the fetched data to the requestor, wherein the data provider is further configured to:
    discard the data fetched from the higher cache memory level when the result of the checks performed is negative; and
    accumulate the data returned by one or more cache memory levels including the high cache memory levels;
a resolver configured to resolve one or more issues based on the one or more checks performed;
wherein the dispatcher is further configured to dispatch a secondary fetch for the same one or more address after resolving one or more issues; and
a bit setter configured to set and reset at least two bits of a fetch address register (FAR) based on the one or more checks and resolution of one or more issues.

8. The system of claim 7 further comprising a dispatcher configured to dispatch a fetch to the next higher cache memory level as soon the request is received from the requestor, wherein each of the memory levels includes a lookup queue for storing a plurality of addresses, and a cache for storing a plurality of data.

9. The system of claim 7 further comprising an evaluator configured to evaluate one or more checks for a full miss or a full hit at each cache memory level.

10. The system of claim 8, wherein the bit setter is further configured to set the at least two bits to "00" whenever a new fetch is dispatched.

11. The system of claim 8, wherein the bit setter is further configured to set the at least two bits to "10" after performing the one or more checks by each cache memory level and resolving issues at each cache memory level.

12. The system of claim 8 further comprising an address comparator for comparing the plurality of addresses of the look up table of each cache memory level with addresses stored in the FAR.

13. The system of claim 8, wherein the requestor is at least one of a user or a software application.

14. A computer program product embodied on a computer readable storage medium having instructions for providing at least one data to one or more requestors from a cache memory including a plurality of cache memory levels arranged in a hierarchy, the computer program product configuring a processor to perform the steps of:
receiving, from a requestor, a request for fetching data from the cache memory; determining one or more addresses in a cache memory level which is one level higher than a current cache memory level using one or more prediction algorithms, wherein the one or more addresses are determined based on a future requirement of data;
pre-fetching the one or more addresses from the high cache memory level;
determining if the data is available in the one or more addresses, wherein if data is available in the one or more addresses then data is fetched from the high cache level, else one or more addresses of a next level which is higher than the high cache memory level are determined and pre-fetched data from one or more addresses;
providing the fetched data to the requestor;
evaluating one or more checks for a full miss or a full hit at each cache memory level;
discarding the data fetched from the higher cache memory level when the result of the checks performed is negative;
resolving one or more issues based on the one or more checks performed;

dispatching a secondary fetch for the same one or more addresses after resolving one or more issues; and setting and resetting at least two bits of a fetch address register (FAR) based on the one or more checks and resolution of one or more issues, wherein the FAR stores multiple addresses.

15. The computer program product of claim 14 further comprises instructions for dispatching a fetch to the next higher cache memory level as soon the request is received from the requestor, wherein each of the memory levels includes a lookup queue for storing a plurality of addresses, and a cache for storing a plurality of data.

16. The computer program product of claim 14 further comprises instructions for:
    evaluating one or more checks for a full miss or a full hit at each cache memory level;
    discarding the data fetched from the higher cache memory level when the result of the checks performed is negative;
    resolving one or more issues based on the one or more checks performed; and
    dispatching a secondary fetch for the same one or more address after resolving one or more issues.

17. The computer program product of claim 14, wherein:
    the at least two bits are set to "00" whenever a new fetch is dispatched; and
    the at least two bits are set to "10" after performing the one or more checks by each cache memory level and resolving issues at each cache memory level.

18. The computer program product of claim 14 further comprises instructions for accumulating the data returned by one or more cache memory levels including the high cache memory levels.

19. The computer program product of claim 14 further comprises instructions for comparing the plurality of addresses of a look up table of each cache memory level with addresses stored in the FAR.

* * * * *